March 11, 1952       F. L. ERICKSON       2,589,067
HYDRAULIC CONTROL SYSTEM
Filed May 26, 1947
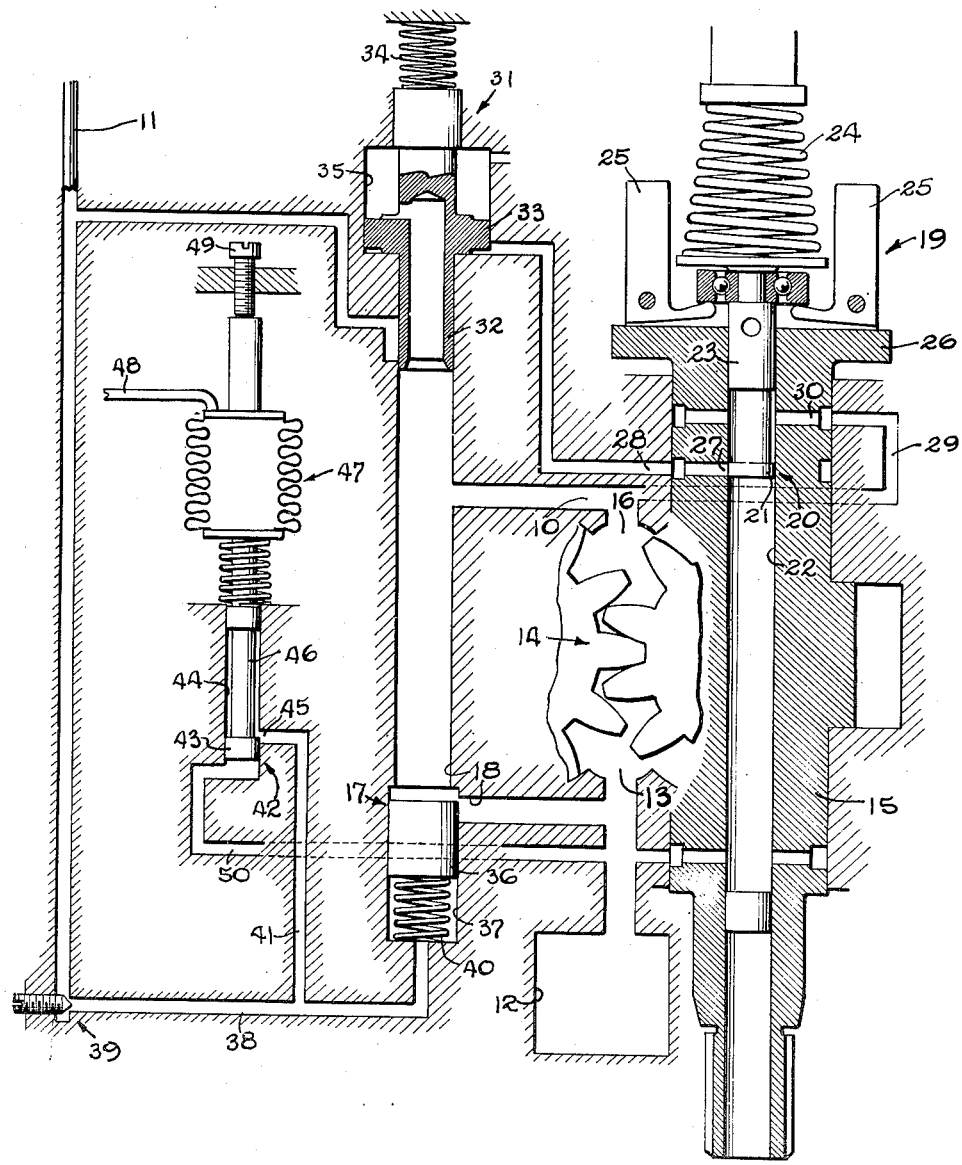
INVENTOR
Francis L. Erickson
By Carlson, Pitzner, Hubbard & Wolfe
ATTORNEYS Patented Mar. 11, 1952

2,589,067

UNITED STATES PATENT OFFICE 2,589,067

HYDRAULIC CONTROL SYSTEM

Francis L. Erickson, Rockford, Ill., assignor to Woodward Governor Company, Rockford, Ill., a corporation of Illinois Application May 26, 1947, Serial No. 750,561

7 Claims. (Cl. 103—11)

This invention relates to a hydraulic control system in which the pressure in a servo motor or other space is normally regulated in response to changes in a main control condition but is subjected at times to the superior control of another or secondary control force or impulse. The invention is more particularly concerned with those systems in which the pressure fluid supply from which the controlled space is charged is regulated automatically by a yieldably loaded relief valve by which fluid is by-passed out of the supply line when the pressure therein rises above a value predetermined by the valve loading.

One object is to provide a novel arrangement for utilizing the pressure regulating or by-pass valve to reduce or dissipate the controlled pressure in response to a predetermined change in the secondary control condition.

A more detailed object is to load the by-pass valve from the pressure supply and to release the loading pressure under the control of the secondary control force.

Other objects and advantages of the invention will become apparent from the following detailed description taken in connection with the accompanying drawing which is a schematic view of a control system embodying the present invention.

For purposes of illustration, the invention is shown in the drawing embodied in a system for regulating the flow of fluid from a supply passage 10 into a space 11 in response to variations of a main control condition which, in the illustrated system, is speed but which may be pressure, temperature, voltage, or any other variable force or quantity. This main control may be overridden and the controlled pressure in the space 11 dissipated or varied in response to a certain change in a secondary control condition which, in this instance, is pressure, but which may be any other measurable quantity. The space 11 may be a passage through which fluid is to be delivered at different rates of flow or it may be the cylinder of a servo actuator of proper design.

The system is supplied with fluid from a sump 12 which communicates with the inlet 13 of a pump 14 herein shown as of the gear type having one element rotatable with a power driven shaft 15. The pump outlet 16 communicates with the supply passage 10, the pressure in which is controlled automatically by a relief valve 17 that governs the flow of fluid from the supply passage through a by-passage 18 to the sump passage 12.

Changes in the main control force, that is speed, are detected in the present instance by a centrifugally acting device 19 which converts changes in the control condition into force changes applied to a pilot valve 20 controlling the flow of pressure fluid from the supply passage 10 to the space 11 through the intermediary of a relay valve 31 in this instance. As shown, the valve 20 comprises a land 21 reciprocable in a bore 22 in the shaft 15 and carried on the end of a stem 23 which is urged downwardly by a spring 24, the force of which may be adjusted to vary the control point of the speed measuring device. The spring force is balanced by a centrifugal force acting on flyweights 25 pivoted on a head 26 on the upper end of the shaft 15.

At one speed determined by the spring adjustment, the land 21 will as shown cover a port 27 formed in the sleeve 15 and communicating with a passage 28. In response to an increase in speed, the land is raised above the port permitting fluid to flow out of the passage 28 to the lower end of the bore 22 which leads to the sump. When the speed decreases below the control point, the land 21 is lowered thereby permitting pressure fluid to flow through the port 27 to the passage 28 from the upper end of the bore 22 which communicates with the supply line 10 through a passage 29 and ports 30 in the sleeve 15. Thus, the flow of fluid to and from the passage 28 is varied automatically with changes in the main control force.

The relay valve 31 has a movable member 32 carried by a piston 33 and urged toward closed position by a spring 34. The piston slides in a cylinder 35 the lower end of which communicates with the passage 28 so that the pressure in the latter opposes the spring 34.

For a purpose to appear later, the by-pass valve 17 is loaded, at least partially, by pressure fluid. To this end, the valve is formed by one end of a piston 36 slidable in a cylinder 37 to variably open and close the by-passage 18. The other end of the cylinder communicates with a source of pressure fluid, in this instance the control chamber 11, through a passage 38 which, for a purpose to appear later, includes an adjustable restriction 39. The by-pass valve piston is also urged in the valve closing direction by a compression spring 40 scaled according to the constant pressure differential which it is desired to maintain between the supply passage 10 and the control chamber 11.

Such hydraulic loading of the by-pass valve enables the secondary control effect or pressure to be utilized through a simple valve arrangement to override the primary control action of the speed responsive device 19. For this purpose, the loading cylinder 37 is adapted to be connected to the sump passage 12 through a passage 41 having interposed therein a normally closed valve 42 which is opened in response to a deviation of the secondary control force to a predetermined value. In this instance, the valve 42 comprises a land 43 slidable in a bore 44 into which the passage 41 opens at a port 45. The stem 46 of the valve is connected to a pressure change detecting device such as a bellows 47 communicating through a passage 48 with a source of secondary control pressure. The control point of the bellows device may be adjusted by means of a screw 49.

When the control pressure is above a predetermined desired value, the land 43 is moved downwardly beyond the port 45 so as to maintain the valve 42 closed and the by-pass valve 17 hydraulically loaded. When the secondary control pressure falls below such value, the land 43 is raised by the bellows above the port 45 thereby establishing communication between the loading cylinder 37 and the sump through the passage 41 and a passage 50 leading from the valve 42. Such by-passing of fluid out of the loading cylinder at a rate greater than the inflow through the restriction 39 dissipates the loading of the by-pass valve and results in a corresponding reduction in the supply pressure in the passage 10 and therefore in the pressure in the controlled space 11.

Such overriding of the main control is effected quickly and by controlling the flow of a relatively small volume of pressure fluid, namely the fluid in the loading cylinder 37. By virtue of the restriction 39, the valve 42 may thus reduce the pressure in the passage 38 to a low value without handling a large volume of fluid. The substantially greater volume of fluid delivered by the pump 10 is, after unloading of the by-pass valve, handled by the main by-pass valve 17. Thus the parts of the overriding control may be made small and compact and very sensitive.

I claim as my invention:

1. A hydraulic control system having, in combination, a container for a body of fluid, a supply passage, a power driven pump operable to withdraw fluid from said container and deliver the same to said supply passage, a fluid space, a valve operable to control the flow of fluid from said supply passage to said space, means for detecting changes in a main control force and applying the same to said valve to vary said fluid flow, a valve for by-passing fluid from said supply passage to said container to regulate the fluid pressure maintained in said passage, a piston slidable in a cylinder to actuate said by-pass valve, spring means urging said piston in a direction to close said by-pass valve, means providing a fluid connection between said space and said cylinder to create a fluid pressure in the latter for supplementing said spring in loading said by-pass valve, said connection including a restriction, means providing a by-passage between said cylinder and said container including a normally closed valve, and means for detecting changes in a secondary control force and applying the latter force to said last mentioned valve to open the same when the secondary force deviates beyond a predetermined value.

2. A hydraulic control system having, in combination, a container for a body of fluid, a supply passage, a power driven pump operable to withdraw fluid from said container and deliver the same to said supply passage, a fluid space, means for detecting changes in a main control force, a valve responsive to changes in said main control force and operable to control the flow of fluid from said supply passage to said space, a valve for by-passing fluid from said supply passage to said container to regulate the fluid pressure maintained in said passage, a piston slidable in a cylinder to actuate said by-pass valve, means providing a fluid connection between said space and said cylinder including a restriction, means providing a by-passage between said cylinder and said container including a normally closed valve, and means for detecting changes in a secondary control force and for actuating said last mentioned valve in accordance with such force changes.

3. A hydraulic control system having, in combination, a container for a body of fluid, a supply passage, a power driven pump operable to withdraw fluid from said container and deliver the same to said supply passage, means for detecting changes in a condition to be regulated and to produce a control force varying in accordance with such changes, a valve responsive to changes in said main control force and operable to control the flow of fluid from said supply passage to a controlled space, a valve for by-passing fluid from said supply passage to said container to regulate the fluid pressure maintained in said passage, a fluid actuator adapted when energized to urge said by-pass valve to closed position, a spring supplementing the force of said actuator in loading the by-pass valve, means for admitting pressure fluid from said space to said actuator through a restriction to charge the actuator at a pressure lower than that in said passage, means providing a passage for the escape of fluid from said actuator, and means for detecting variations in a secondary control force operable to open and close said escape passage.

4. A hydraulic control system having, in combination, a container for a body of fluid, a supply passage, a power driven pump operable to withdraw fluid from said container and deliver the same to said supply passage, a valve operable to control the flow of fluid from said supply passage to a controlled space, means for detecting changes in a main control force and applying the same to said valve to vary said fluid flow, a valve for by-passing fluid from said supply passage to said container to regulate the fluid pressure maintained in said passage, a fluid actuator adapted when charged to load said by-pass valve, means establishing communication between said space and said actuator through a restriction whereby to normally load said by-pass valve at a pressure lower than that in said passage, means providing a passage for the escape of fluid from said actuator, a valve controlling said escape passage, and means for detecting changes in a secondary control force and applying such force changes to said last mentioned valve.

5. A hydraulic control system having, in combination, a container for a body of fluid, a supply passage, a power driven pump operable to withdraw fluid from said container and deliver the same to said supply passage, a valve operable to control the flow of fluid from said supply passage to a controlled space, means for detecting changes in a main control force and applying the same to said valve to vary said fluid flow, a valve for by-passing fluid from said supply passage to said container to regulate the fluid pressure maintained in said passage, a fluid actuator energized by fluid from said space and normally urging the by-pass valve closed, a valve controlling the escape of fluid from said actuator, means for detecting changes in the value of a secondary control force, and means actuated by said last mentioned means and operable to maintain said escape valve closed until the secondary control force deviates beyond a predetermined value and then open the valve.

6. A hydraulic control system having, in combination, a container for a body of fluid, a supply passage, a power driven pump operable to withdraw fluid from said container and deliver the same to said supply passage, a valve operable to control the flow of fluid from said supply passage, means for detecting changes in a main control force and applying the same to said valve to vary said fluid flow, a valve for by-passing fluid from said supply passage to said container to regulate the fluid pressure maintained in said passage, a fluid actuator normally energized continuously to urge the by-pass valve closed, means for detecting changes in a secondary control force, and means operated selectively by said last mentioned means to deenergize said fluid actuator and unload said by-pass valve when the secondary control force deviates to a predetermined value.

7. In a system for regulating the fluid pressure in a controlled passage, the combination of means including a supply passage providing a source of fluid under pressure, means for detecting changes in one control force, a valve controlled by said detecting means and operable to regulate the flow of fluid from said supply passage to said controlled passage, a valve adapted when opened to release pressure fluid from one of said passages, a hydraulic actuator for actuating said second valve and for normally urging the valve toward closed position, a third valve selectively operable to vary the fluid pressure energizing said actuator, means for detecting changes in a secondary control effect, and means operated by said last mentioned means for actuating said third valve in accordance with changes in said control effect.

FRANCIS L. ERICKSON.

REFERENCES CITED

The following references are of record in the file of this patent:

UNITED STATES PATENTS

| Number | Name | Date |
| --- | --- | --- |
| 1,382,315 | Philippi | June 21, 1921 |
| 2,342,685 | Norcross | Feb. 29, 1944 |
| 2,344,991 | Lilja | Mar. 28, 1944 |
| 2,373,138 | Morith | Apr. 10, 1945 |
| 2,409,975 | Curtis | Oct. 22, 1946 |
| 2,420,052 | Muir | May 6, 1947 |
| 2,478,183 | Drake | Aug. 9, 1949 |